June 14, 1955
J. J. SABATINI
2,710,542
ENGINE STARTER DRIVE
Filed Oct. 8 1953
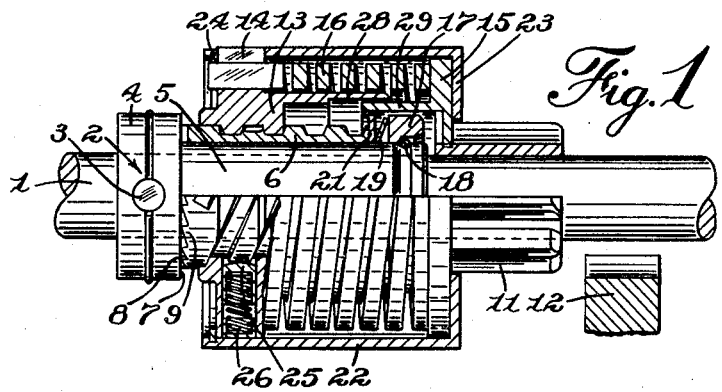
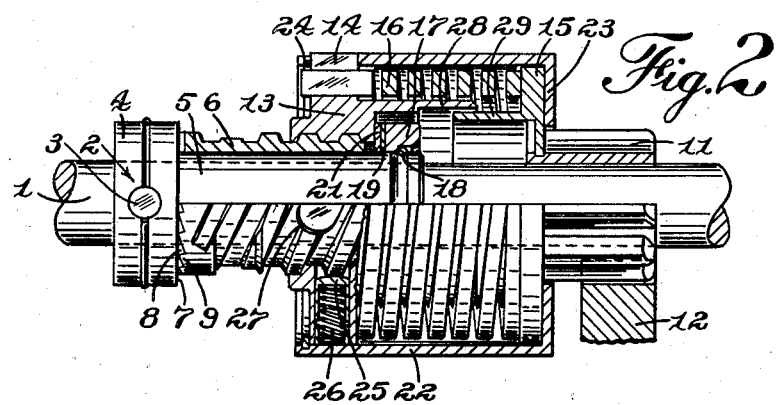
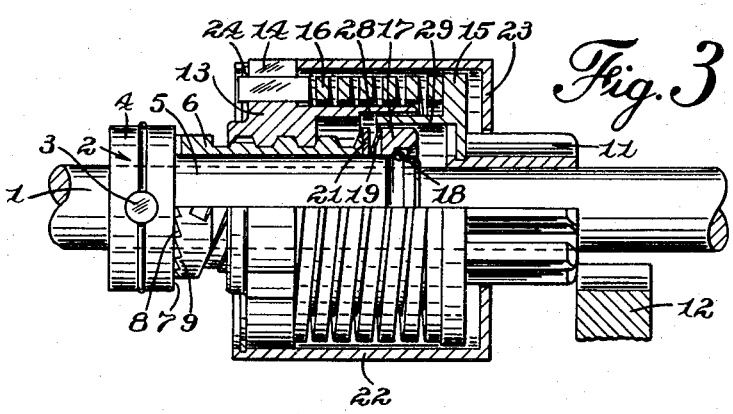
WITNESS:
*Esther M. Stockton*
INVENTOR.
*John J. Sabatini*
BY
*Clinton S. Janes*
ATTORNEY

2,710,542
ENGINE STARTER DRIVE

John J. Sabatini, Elmira, N. Y., assignor to Bendix Aviation Corporation, a corporation of Delaware Application October 8, 1953, Serial No. 385,015

4 Claims. (Cl. 74—7)

The present invention relates to an engine starter drive and more particularly to a drive of the automatically engaging and disengaging type which is substantially shorter than comparable commercial types of drives, and which has superior operating characteristics particularly with respect to cold weather meshing.

It is an object of the present invention to provide a novel engine starter drive in which a yielding driving connection is located immediately adjacent the pinion whereby the inertia of the parts subjected to shock loads when the starter is actuated is reduced to a minimum.

It is another object to provide such a device in which the polar moment of inertia of the parts which are traversed during the meshing operation is comparatively large in relation to their weight so as to facilitate the traversing action under adverse conditions.

Further objects and advantages will be apparent from the following description taken in connection with the accompanying drawing in which:

Fig. 1 is a side elevation partly broken away and in section of a preferred embodiment of the invention showing the parts in idle position;

Fig. 2 is a view similar to Fig. 1 showing the parts in cranking position; and

Fig. 3 is a similar view showing the parts in the positions assumed in case of tooth abutment between the pinion and the engine gear during the meshing operation.

In Fig. 1 of the drawing there is illustrated a power shaft 1 on which a sleeve 2 is rigidly mounted in any suitable manner as indicated at 3. Sleeve 2 comprises a driving head 4 and a smooth cylindrical portion of reduced diameter 5 on which a hollow screw shaft 6 is slidably journaled. A shoulder 7 on sleeve 2 formed by said reduction in diameter is provided with inclined overrunning clutch teeth 8, and screw shaft 6 is provided on its adjacent end with mating clutch teeth 9.

A pinion 11 is slidably journaled on the power shaft 1 for movement into and out of mesh with an engine gear 12. Means for actuating the pinion from the screw shaft 6 is provided comprising a control nut 13 threaded on the screw shaft and having a coupling means in the form of a radial flange 14 formed thereon which is connected to a similar coupling means in the form of a radial flange 15 on pinion 11, by means of a torsion and compression drive spring 16 which is anchored at its ends to said flanges, respectively.

The meshing movement of the control nut 13 is limited by a stop ring 17 anchored on the end of the sleeve 2 as by means of a lock ring 18. A light compression spring 19 is interposed between the stop ring 17 and a thrust washer 21 bearing against the adjacent end of the screw shaft 6 and thus serves to yieldingly hold the overrunning clutch teeth 8, 9 of the sleeve and screw shaft in engagement.

A barrel member 22 is arranged to surround and enclose the flanges 14, 15 of the control nut and pinion respectively and holds the drive spring 16 under initial compression between said flanges by means of an inturned flange 23 on one end of the barrel and a lock ring 24 at its other end.

Means are provided for resisting demeshing movement of the pinion and its associated parts until they are rotating above a predetermined speed. For this purpose a detent member 25 is mounted for radial sliding movement in the flange 14 of the control nut 13 and is yieldably pressed against the surface of the screw shaft 6 by means of a spring 26 which is confined on the control nut by the barrel member 22. The screw shaft is provided with a notch 27 (Fig. 2) so positioned that the detent 25 enters said notch shortly before the meshing movement of the pinion is completed. Demeshing movement of the pinion is accordingly prevented until such time as the detent is withdrawn by centrifugal force. If deemed desirable, a plurality of detents 25 may be provided, equally spaced about the axis of the drive.

The control nut and pinion are preferably provided with telescopic extensions 28, 29 respectively, which are embraced by the spring 16, whereby collapse of the spring under momentary excessive torque is prevented.

In operation, starting with the parts in the positions illustrated in Fig. 1, rotation of the power shaft 1 is transmitted to the sleeve 2, and through clutch teeth 8, 9 to the screw shaft 6 whereby the control nut 13 is traversed to the right until it engages the thrust washer 21 and presses it against the stop ring 17, flattening the spring 19 in the process. Pinion 11, having thus been traversed into mesh with the engine gear 12, is yieldably rotated by the control nut 13 through the drive spring 16, the clutch teeth 8, 9 being at that time firmly pressed together by the screw-jack action of the screw shaft and control nut.

If, during the meshing operation, tooth abutment should occur between the pinion and engine gear, the longitudinal movement of the pinion is arrested as shown in Fig. 3, and the drive spring 16 is compressed and torqued by the control nut until the pinion is indexed into proper registry with the tooth spaces of the engine gear whereupon the drive spring expands and snaps the pinion into initial mesh, and the meshing operation is completed in the usual manner.

When the engine fires, the pinion 11 and its associated parts including the control nut 13 are accelerated so as to cause the control nut to overrun the screw shaft until arrested by engagement of the detent 25 against the end of the notch 27. The screw shaft is thus rendered free to overrun the sleeve 2 as long as the pinion 11 is driven faster than the rotation of the starting motor.

When the engine becomes fully self-operative, the pinion 11 is rotated at sufficient speed to cause withdrawal of the detent 25 by centrifugal force, thus permitting the parts to be returned to their idle position.

It will be noted that the locating of the drive spring 16 between the control nut and pinion, surrounding the telescoping portion of said elements produces a drive of very short over-all length. This arrangement, with the barrel member 22 surrounding and enclosing the spring has the additional advantage that the mass of these parts is located farther from the axis of the drive than is the usual case, so that the polar moment of inertia of the parts is considerably greater than in more conventional forms of drive. This arrangement is particularly advantageous in cold weather starting since it ensures the longitudinal traversal of these parts even in cases where lubricant may be congealed on the threads of the screw shaft and control nut, and the acceleration of the power shaft 1 may be somewhat sluggish due to the climatic conditions.

Although but one embodiment of the invention has been shown and described in detail, it will be understood that other embodiments are possible and changes may be made in the design and arrangement of parts without departing from the spirit of the invention.

I claim:

1. In an engine starter drive, a power shaft, a sleeve fixed thereon comprising a driving head and a smooth reduced portion, a screw shaft slidably journaled on said reduced portion of the sleeve, said driving head and screw shaft having cooperating overrunning clutch teeth, a control nut threaded on the screw shaft, having coupling means formed thereon, a pinion provided with similar coupling means slidably journaled on the power shaft for movement into and out of mesh with a gear of an engine to be started, a torsion and compression drive spring surrounding the control nut and connected at its ends to the coupling means on the control nut and pinion respectively, and a stop ring on said sleeve limiting the meshing movement of the control nut.

2. An engine starter drive as set forth in claim 1 in which said control nut and pinion are provided with radial flanges to which the ends of the drive spring are respectively anchored, and including further a barrel member surrounding and enclosing said flanges and spring, and having means for limiting the separation of the flanges, to hold the drive spring under initial compression.

3. An engine starter drive as set forth in claim 2 including further a light compression spring between the screw shaft and stop ring yieldably holding the clutch teeth in engagement.

4. An engine starter drive as set forth in claim 1 in which the screw shaft is provided with a peripheral notch, and including further a centrifugal detent on the control nut positioned to engage said notch and hold the pinion in mesh with the engine gear until the control nut is rotated above a predetermined speed, and a spring between the screw shaft and stop ring yieldably holding the clutch teeth in engagement.

References Cited in the file of this patent

UNITED STATES PATENTS 2,605,449   Digby _____ Aug. 12, 1952